H. S. LYSTER.
TIRE PROTECTING ANTISKID APPLIANCE.
APPLICATION FILED MAY 7, 1920.
1,398,732.  Patented Nov. 29, 1921.
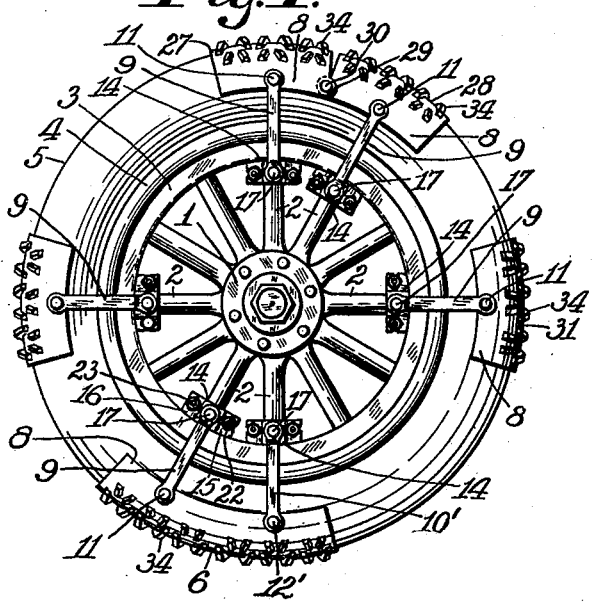
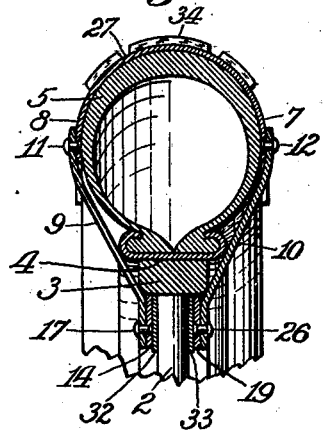
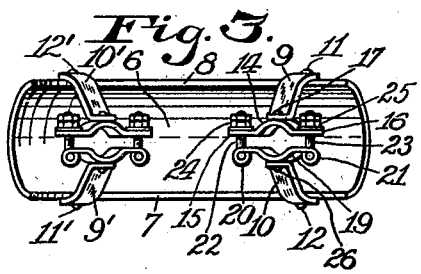
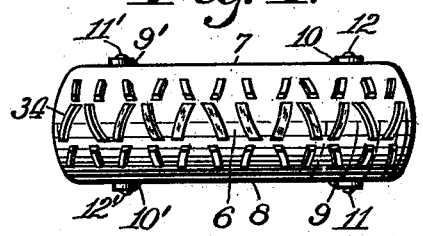
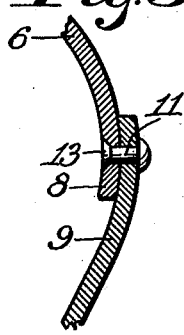
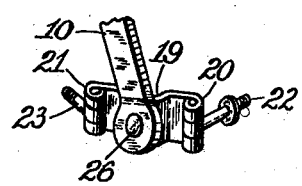
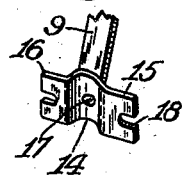
WITNESS:
Ed J. Clark.
F. N. Roeder.
INVENTOR:
Herman S. Lyster,
BY
E. T. Silvius,
ATTORNEY.

UNITED STATES PATENT OFFICE.

HERMAN S. LYSTER, OF INDIANAPOLIS, INDIANA.

TIRE-PROTECTING ANTISKID APPLIANCE.

1,398,732.   Specification of Letters Patent.   Patented Nov. 29, 1921.

Application filed May 7, 1920. Serial No. 379,442.

*To all whom it may concern:*

Be it known that I, HERMAN S. LYSTER, a citizen of the United States, residing at Indianapolis, in the county of Marion and State of Indiana, have invented a new and useful Tire-Protecting Antiskid Appliance, of which the following is a specification, reference being had to the accompanying drawings and to the letters and figures of reference marked thereon.

This invention relates to an appliance that is designed to be connected to a vehicle wheel having a rubber or resilient tire, and especially a pneumatic tire, to protect the tire from wear and to prevent the tire from slipping on the ground, especially on a muddy surface, or a wet pavement, the invention having reference more particularly to an appliance of the above-mentioned character that is designed to be quickly applied for use in emergency.

An object of the invention is to provide a tire-protecting anti-skid appliance which shall be so constructed as to be adapted to constitute a shoe on a tire tread, and to be held in place by a spoke and the felly of a wheel, and which may be readily removed when not needed.

Another object is to provide an emergency shoe for motor vehicle wheels which may be made of small proportions relatively to the circumference of the tire, and therefore be inexpensive and yet efficient and economical in use.

With the above-mentioned and other objects in view, the invention consists in a tire-protecting shoe having novel means whereby to connect it to a wheel to hold it on the wheel tire, the shoe having a cleated or roughened surface to prevent skidding or slipping of the tire on the ground; and, the invention consists also further in the parts and combinations and arrangements of parts as hereinafter particularly described and further defined in the accompanying claim.

Referring to the drawings,—Figure 1 is a front elevation of a vehicle wheel having a pneumatic tire thereon and provided with the invention in several of its specific forms; Fig. 2 is a fragmentary transverse section of a portion of Fig. 1 on an enlarged scale, as on a vertical plane through the uppermost portion of the tire the inner tube or air bag of the tire being omitted; Fig. 3 is a plan showing the inner side of the tire shoe as preferably constructed, the fasteners of the shoe being seen perspectively; Fig. 4 is a plan or front view of the tire shoe; Fig. 5 is a fragmentary section of several associated parts of the shoe; Fig. 6 is a fragmentary perspective view of one of the securing devices, and Fig. 7 is a fragmentary perspective view of the companion one of the securing devices.

Similar reference characters in the different figures of the drawings indicate corresponding elements or features of construction herein referred to in detail.

In the drawings the numeral 1 indicates the hub, 2 the spokes, 3 the felly, 4 a suitable rim on the felly, and 5 the casing of a pneumatic tire on the rim.

Preferably each shoe is composed of metal, such as sheet metal and is curved longitudinally and transversely to conform to the curvature of the tire, and has a tread portion 6 and two side portions 7 and 8. The shoe preferably is of sufficient length to permit it to be connected to two of the wheel spokes and thus it has two connecting rods 9 and 10 connected by suitable devices 11 and 12 to the side portions respectively of the shoe in proximity to one end of the shoe, and likewise two similar connecting rods 9′ and 10′ are connected to the side portions respectively of the shoe adjacent to the opposite end thereof, by means of suitable devices 11′ and 12′ respectively, the securing devices, as 11, being preferably in the form of pivots having each a flat or counter sunk head 13 at the inner side of the shoe, the connecting rods being arranged on the outer side of the shoe. The connecting rods being arranged in pairs are provided with slide-lugs respectively to coöperate each with the other to embrace a wheel spoke. One slide-lug comprises a curved main portion 14, having ears 15 and 16 thereon. The convex side of the main portion is arranged against the inner side of the connecting rod 9 and connected thereto by a suitable device, preferably a pivot 17. Each ear has an opening therein which preferably is a slot 18 to receive a connecting bolt. The slide-lug with which the companion connecting rod is provided comprises a curved main portion 19 which preferably has hinge ears 20 and 21 thereon to which bolts 22 and 23 are pivotally connected respectively, so that the bolts can not become detached and lost or misplaced when not in operation, and permits the bolts to be swung into the slots of the companion slide-lug, the bolts being provided respectively with nuts 24 and 25. The convex side of the curved portion 19 is arranged against the inner side of the connecting rod 10 and connected thereto, preferably by means of a pivot 26. The pair of connecting rods is of suitable length to permit the slide-lugs to engage the inner portion of the felly to hold the shoe closely on the tire tread, the slide-lugs being adapted to slide along the spoke when the load shifts onto or off of the shoe.

In a slightly modified form the shoe comprises two tread portions 27 and 28, each having the side portions 7 and 8 which are provided with pivot ears 29 near their edges that are connected together by pivots 30, to constitute two shoe sections hinged together; and each section is provided with a pair of the connecting rods 9 and 10 and the slide-lugs as above described, each pair of slide-lugs being connected with a spoke of the wheel and operable independently of the other pair. In other cases, especially for the smaller wheels, a relatively short shoe is provided having a curved tread portion 31 and the side portions as above described which are provided with one pair or connecting-rods and the slide-lugs.

Preferably the inner or concave sides of the slide-lugs have cushion liners 32 and 33 respectively to permit sliding arrangement without marring the painted surface of the spokes.

The tread portion of each shoe or section thereof has suitable cleats 34 thereon to prevent the shoe from slipping, more particularly in mud or soft ground when the vehicle is heavily loaded.

In practical use one or more of the shoes or sections thereof may be applied to the driving wheels of the vehicle when needed in emergency to enable the wheels to move the vehicle, and they may be permitted to remain on the wheels indefinitely, particularly in case it is preferred to cover the whole tread portion or most of it with the shoes or sections thereof. In some cases one of the shorter shoes may be sufficient to meet the emergency. When the wheel is forced to rotate and a shoe is brought to the ground the tire may slip slightly in the shoe, but as the slide-lugs are stopped in contact with the wheel felly, the extent of slippage is limited by the connecting rods. When the weight is on a shoe the tire may yield slightly and cause the slide-lugs on the lowermost spoke of the wheel to slip upward along the spoke, the slide-lugs being again drawn to the felly as the wheel rotates so that the load is carried off of the shoe.

Having thus described the invention, what is claimed as new is—

A tire-protecting anti-skid appliance comprising a metallic shoe curved longitudinally and transversely, straight pivots secured to and projecting from the convex sides of the shoe adjacent to the longitudinal edges thereof, longitudinally-unyielding connecting-rods having portions arranged on the convex side of the shoe and connected to the pivots respectively adjacent to one end of the connecting-rod, slide lugs curved centrally and having each a pivot projecting straight from the convex side thereof, the latter pivots being connected to the connecting rods adjacent to the opposite end thereof, and means to connect said slide lugs to position the same around the spoke of the wheel.

In testimony whereof I affix my signature in presence of two witnesses.

HERMAN S. LYSTER.

Witnesses:
E. T. SILVIUS,
F. M. ROEDER.